3,391,656
DIE AND MOLD FOR ENCAPSULATING FILLING IN LONGITUDINAL PASTRY
Leonhard Schafer, 219 Miriam St.,
Bronx, N.Y. 10458
Filed Sept. 2, 1966, Ser. No. 577,048
5 Claims. (Cl. 107—1)

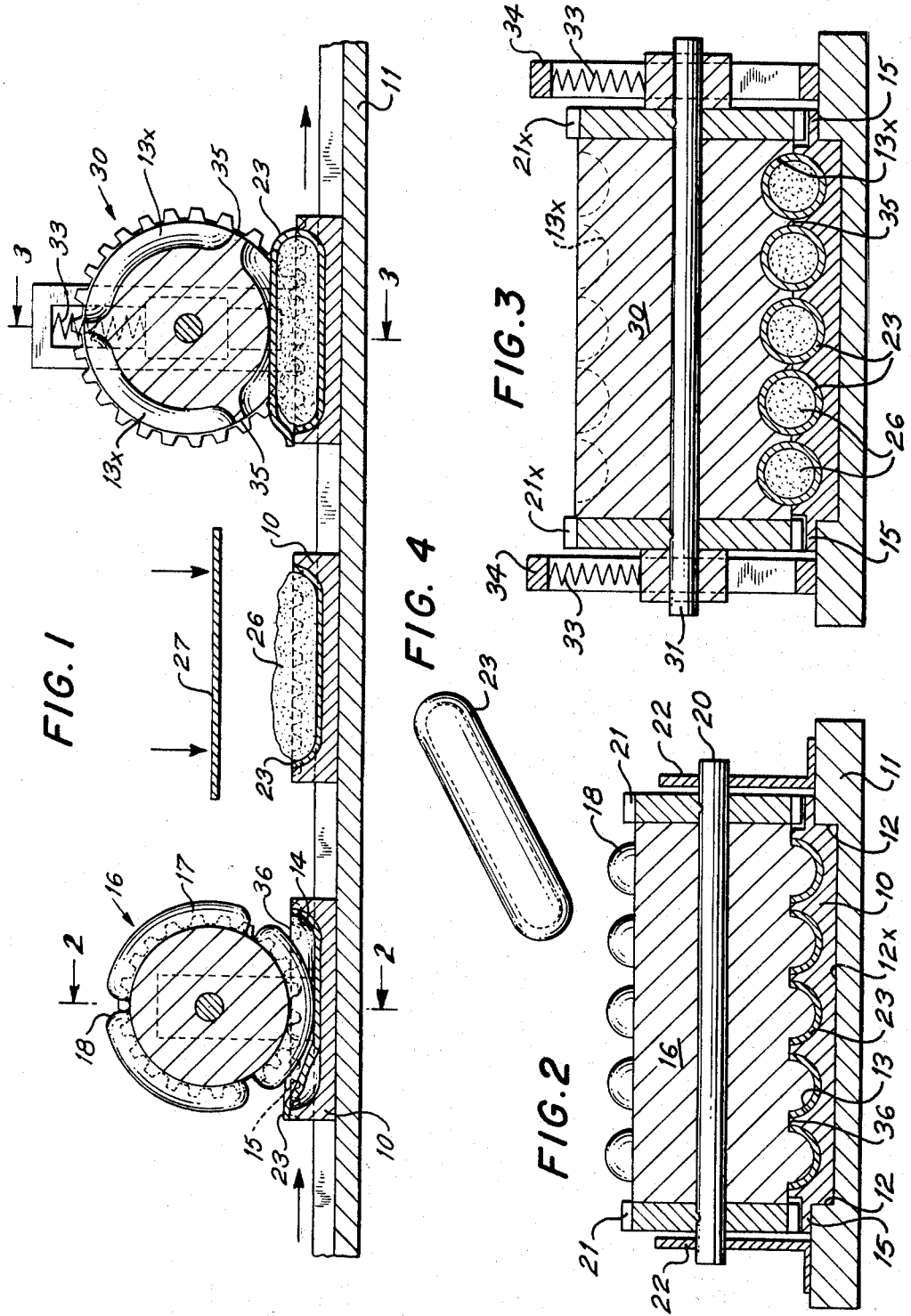

ABSTRACT OF THE DISCLOSURE

This invention relates to a device for seamless and leak-proof encapsulating an edible filling within a pastry envelope. The device comprises a geared cylindrical rotatable protuberant male die, a co-acting geared cylindrical rotatable cavity containing sealer female die, used in spaced apart sequential relationship to said male die, and a pinion containing planar die having female cavities adapted to mate with said protuberances of said male die and with said female cavities of said female rotatable die, whereby meshing of said gears of said rotatable dies to the pinion of said planar die is adapted to seamlessly envelope a pastry blanket about said filling.

---

This invention relates to a device for completely enclosing a filling with an integral pastry envelope.

In the prior art, fillings for pastry were introduced by puncture of the shell as in making jelly doughnuts and by other means, which because of a rupture or break in the pastry shell failed to produce a totally enclosed, leak proof product.

According to this invention the filled pastry product is completely concealed and enveloped within its pastry shell.

This invention is illustrated in the accompanying drawing in which;

FIG. 1 is a side elevation view of the invention showing the three stages for preparing the enveloped product, namely the pastry forming stage, the pastry filling stage and the pastry encapsulating or enveloping stage, FIG. 2 is a section view taken along line 2—2 of FIG. 1, FIG. 3 is a section view taken on line 3—3 of FIG. 1, and FIG. 4 is a perspective view of the final pastry product showing in dotted outline the fully enveloped filling.

Turning to the drawing, a multi-cavity die 10 is slidably disposed in a longitudinal base plate 11.

As shown in FIGS. 1 and 2, the base plate 11 is provided with a central channel having side walls 12 and a length 12X. The female die 10 is provided with five semi-cylindrical female cavities 13 having hemi-spherical ends 14. In this invention many dies 10 are slidably mounted in the channel of the base plate 11 and are moved from one station or stage to the next as desired.

The dies are provided on each side with a pinion rack 15. The cylindrical male die 16 is provided with three rows of five parallel suitably spaced-apart protuberances 17 having hemispherical ends 18. The protuberances 17 extend about one-third of the circumference thickness.

The pastry blanket 23 of suitably predetermined size is deposited upon the female die 10 and on being rolled under the male die 16 a semi-cylindrical pastry shell 25 is formed in each female cavity (FIG. 2).

Next, the die 10 is moved to station or stage 2 where a filling 26 and then a top pastry blanket 27 of suitable predetermined size and thickness is added upon the filled die 10.

Finally the die 10 and its filled pastry shell and pastry blanket 27 is moved to engage the gears 21X of the female die 30. The male die 16 on one revolution co-acts with three female dies 10, so that the three female dies 10 preferably are formed in one block having three rows of cavities 13.

The male die 16 is provided with a shaft 20 to the ends of which are keyed gears 21. The gears 21 mate with the pinion rack 15 so that the protuberances 17 mate with the cavities 13. A pair of end supports 22 are so disposed on each end of the shaft 20 that allowance is made for the pastry 23 relative to the rotatable encapsulator or enveloper die 30.

As seen in FIGS. 1 and 3, the enveloper die 30 is of cylindrical configuration having three rows of curved female cavities 13X.

The die 30 is provided with a shaft 31 which is keyed at both of its ends to gears 21X. The shaft 31 is under downward spring pressure due to springs 33 disposed in spring holders 34 acting continuously on shaft 31.

The pressure of the springs 33 co-acting with the smooth mating of curved die surfaces 35 located between cavities 13X with the smooth planar surfaces 36 located between the cavities 13 of the die 10 causes the excess pastry blanket 27 therebetween to be squeezed or compressed into a cavity (FIG. 3) to yield a substantially seamless envelope or casing completely enveloping the filling 26, so that the enveloped pastry may be subsequently baked or fired without oozing or escape of any filling.

Accordingly the multi-die of this invention produces a seamless or substantially seamless filled pastry product suitable for subsequent baking or cooking.

The filling 26 may be a spoonable type filling or it may be a sausage or frankfurter of suitable pre-determined size.

The device of this invention may be automated if desired.

What is claimed is:

1. A device for encapsulating a filling within an envelope of pastry comprising a base plate having a female die receiving channel therein; a flat female die slidably disposed in said channel, and having a pinion rack along at least one side; a rotatable male die transversely mounted over said channel and having protuberances adapted to matingly press as it rotates a pastry blank into the cavities of the female die; and rotatable sealing means transversely mounted over said channel in spaced relationship to said rotatable male die, said rotatable sealing means having cavities therein corresponding to said protuberances and adapted to co-act with a top pastry blanket disposed over filled pastry in said female die to compress said top blanket about said filled pastry to form filling enveloped pastry units.

2. The device of claim 1 wherein the female cavities in the female die are separated from one another by planar horizontal walls and wherein the cavities of said sealer means are separated by smooth curved walls adapted to engage said planar walls of said female die in suitable pressure engagement to force pastry therebetween into the adjacent cavities.

3. The device of claim 2 comprising gear means secured to each of said rotatable dies and sealer means to effect a keyed engagement with the pinion of a planar female die thereunder to produce a mating of the rotatable die protuberances and sealer cavities to the female cavities of said planar die.

4. The device of claim 3 comprising spring loaded means acting on said rotatable sealer means with a pressure sufficient to cut and squeeze the pastry blanket between the sealer means and the female die to form a compressed envelope about said filling.

5. The device of claim 3 wherein said rotatable male die has a plurality of circumferentially spaced-apart male protuberances.

References Cited

UNITED STATES PATENTS

| 1,169,546 | 1/1916 | Lawrence | 107—1 |
|---|---|---|---|
| 2,494,236 | 1/1950 | Goldstein | 107—1.5 |
| 3,013,509 | 12/1961 | Jahn | 107—1.1 |

FOREIGN PATENTS

| 16,154 | 9/1905 | Great Britain. |
|---|---|---|
| 354,788 | 12/1937 | Italy. |

WALTER A. SCHEEL, *Primary Examiner.*

ARTHUR O. HENDERSON, *Assistant Examiner.*